United States Patent
Gillemot et al.

[11] 3,916,086
[45] Oct. 28, 1975

[54] SLIT CABLE SPLICE HOUSING WITH INTEGRAL LOCK FOR HOLDING SLIT CLOSED AND WITH VALVED CHARGING OPENING FOR A POTTING COMPOUND

[76] Inventors: George W. Gillemot, 2331 20th St., Santa Monica, Calif. 90405; John T. Thompson, 244 Loring Ave., Los Angeles, Calif. 90024

[22] Filed: Aug. 12, 1974

[21] Appl. No.: 496,657

Related U.S. Application Data

[60] Continuation of Ser. No. 363,076, May 23, 1973, abandoned, which is a division of Ser. No. 263,551, June 16, 1972.

[52] U.S. Cl. ............... 174/93; 174/76; 174/92; 174/138 F
[51] Int. Cl.² ........................................ H02G 15/08
[58] Field of Search ........ 174/92, 93, 88 R, 76, 5 R, 174/72 A, 77 R, 138 F; 138/166, 162, 156

[56] References Cited
UNITED STATES PATENTS

| | | | |
|---|---|---|---|
| 420,171 | 1/1890 | Seely | 174/92 X |
| 667,195 | 2/1901 | Davis | 174/72 A UX |
| 2,784,129 | 3/1957 | Stephens | 138/166 X |
| 2,927,955 | 3/1960 | Crawford | 174/92 X |
| 3,711,633 | 1/1973 | Ghirardi et al. | 174/92 X |
| 3,715,459 | 2/1973 | Hoffman | 174/76 X |

FOREIGN PATENTS OR APPLICATIONS

| | | | |
|---|---|---|---|
| 505,013 | 5/1939 | United Kingdom | 174/92 |

*Primary Examiner*—Darrell L. Clay
*Attorney, Agent, or Firm*—Harris, Kern, Wallen & Tinsley

[57] ABSTRACT

A tubular cable splice housing formed in one piece from tough resilient plastic material slit lengthwise thereof to permit forced opening of the slit for reception of cabling and provided with integral lock means to hold the slit positively closed. A tough highly resilient plastic serves these purposes, the slit including complementally shaped interlocking portions integral with portions of the housing carried by the opposite sides of the slit. The housing preferably includes a charging opening for potting compound and an embracing split sleeve valve rotatable about the housing between the open and closed positions.

5 Claims, 8 Drawing Figures

SLIT CABLE SPLICE HOUSING WITH INTEGRAL LOCK FOR HOLDING SLIT CLOSED AND WITH VALVED CHARGING OPENING FOR A POTTING COMPOUND

This application is a continuation of our copending application for U.S. patent application Ser. No. 363,076 filed May 23, 1973, and now abandoned, which application is a division of our application for U.S. patent application Ser. No. 263,551, filed June 16, 1972.

This invention relates to cable splice assemblies, and more particularly to a one-piece tubular housing for enclosing a cable splice characterized in being formed in one piece from tough resilient plastic material slit lengthwise thereof and including integral interlocking means therealong for locking the slit closed and against spreading.

There are now available techniques for providing a high-capacity high-strength electrical splice between a continuous main power distribution cable and a branchout cable utilizing a deformable clamping member clenchably interconnecting the two cables without need for doing more than removing a length of insulation from each. Not infrequently such branchouts are made in multiple. This practice presents problems as respects the enclosure of the splice connection and the adjacent portions of the cable sheath with a suitable reliable weather-tight protective housing. Desirably, the enclosure should be readily assembled about the cabling using a minimum number of parts.

These needs are satisfied by the present invention in a highly satisfactory manner using a minimum number of tubular elastomeric components each split longitudinally of one side to permit the tubular members to be expanded sufficiently for assembly to the cabling from one side thereof after completion of the splice connection. These components include a resilient relatively stiff main body, a sleeve valve of the same material snugly embracing the mid portion of the main body, and several grommets of soft flexible elastomeric material embracing the cabling to either side of the splice connection and cooperating to close the opposite ends of the main body. Some of these grommets include adapter sleeves seated in passage of the main grommet and serving to provide a snug seal between this passage and smaller size branchout cables. The rotary valve overlies a charging opening for potting compound filling the interior of the assembled splice housing. After the housing has been charged, the valve is rotated to seal the charging opening. The main housing includes portions along its slit edges designed to interlock with one another to hold the slit edges closed and snugly embracing the closure grommets at its opposite ends until the potting compound takes a set. Thereafter, the potting compound forms a strong bond with surfaces in contact therewith and supplements the locking tangs in holding the main body assembled. Desirably, the grommets include flexible annular ribs assuring sealing contact with juxtaposed surfaces of the cabling and of the housing parts. If one of the cable outlets is not required to seat a cable, a closure plug is inserted and sealed in place by contact with the potting compound. All components required to complete a splice housing assembly, including a settable potting compound, are preferably packaged for shipment and protection against loss of components until ready for use in the field.

Another object of the invention is the provision of a cable splice housing comprising an open end tube slit lengthwise of one side and equipped with interlocking means for holding its slit edges closed together.

Another object of the invention is the provision of a cable splice housing including an open end tube slit lengthwise of one side and sufficiently resilient to permit of its assembly about cabling from one side of the cable and including a cooperating slit tubular valve closely embracing the first mentioned tube and rotatable between a position for charging the housing with potting compound and a second position closing the charging opening.

Another object of the invention is the provision of a one-piece tubular enclosure for cable splices and the like formed of stiff resilient plastic material slit lengthwise thereof and including integral complementally shaped portions interlockable with one another to prevent opening of said slit.

Another object of the invention is the provision of a tubular cable splice enclosure slit lengthwise thereof and formed with integral interlocking portions to lock the slit closed and including rotary sleeve valve means to close a potting compound charging opening in the side of the enclosure.

These and other more specific objects will appear upon reading the following specification and claims and upon considering in connection therewith the attached drawing to which they relate.

Referring now to the drawing in which a preferred embodiment of the invention is illustrated:

Figure 1:
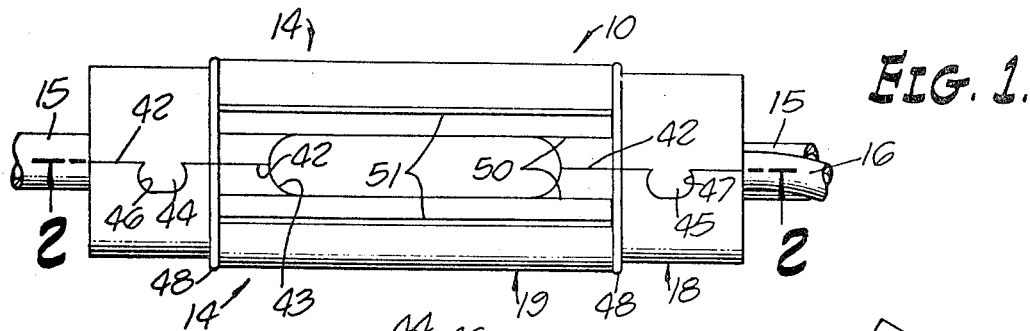
FIG. 1 is a longitudinal view of a preferred embodiment of the invention assembled to cabling and showing the charging valve in open position.

Referring initially more particularly to FIGS. 1–6 there is shown an illustrative embodiment of the invention cable splice housing, designated generally 10, the components of which are shown packaged as a kit in a plastic envelope 11. The kit components include a sealed package 12 enclosing a package of polymerizable potting compound, a ductile metal splice connector 13, and all components of the splice housing assembly per se 14. These various components are sealed within the plastic package 11 for protection against loss or exposure to the elements or contaminants prior to use.

It will be understood that the sealed envelope 12 preferably contains the two principal ingredients of the potting compound in liquid form sealed in an envelope and held separated from one another therein in any well known manner, as by a removable spring clip in accordance with a technique well known in this art and shown in greater detail in our U.S. Pat. No. 3,523,607, granted Aug. 11, 1970. In accordance with customary practice, the spring clip is removed immediately prior to use of the compounds, thereby permitting the ingredients to be thoroughly intermixed before being charged into the splice housing where the compound polymerizes into a solid mass adhering strongly to surfaces in contact therewith.

All components of the splice housing 14 are generally tubular and each includes at least one longitudinal slit through the wall thereof thereby permitting the edges of the slit to be spread apart sufficiently for lateral assembly over cabling.

As here shown by way of example, the cabling comprises a continuous power distribution cable 15 and a branchout power cable 16 rigidly and inseparably spliced together between the exposed conductors of each by the ductile metal connector 13. This connector has laterally opening channels along either lateral edge for receiving bared cable conductors following which the connector is placed between the jaws of a heavy duty clenching device operating to compress the connector into high pressure conforming contact with the conductors. In so doing, substantial areas of the connector are upset and deformed as the lateral edges are pressed against one another to completely encircle the conductors of each cable.

Housing assembly 14 includes a tubular main body shell 18, a valve sleeve 19, a pair of tubular grommets 20, 20, a plurality of adapter grommets 22, and a plurality of plugs 23 sized to have a snug frictional fit within the interior of the adapter grommets 22. The latter fit frictionally within either of the two cylindrical passages 24, 25 (FIG. 3) of grommets 20.

The main grommets 20 have a thick walled tubular body 26 integral with a pair of similar thick tubular walls 28, 29 forming the walls of the cylindrical passages 24, 25. Each of the passages 24, 25 is adapted to seat a cable or, alternatively, one of the adapter grommets 22 when it is desired to accommodate a smaller diameter branchout cable, such as cable 16.

The sidewalls of main grommets 20 and of adapter grommets 22 are slit lengthwise of one side thereof permitting the edges of the slit to be expanded and opened away from one another sufficiently to permit insertion of the cable laterally into the interior of the cable seating passage. Thus, grommet 20 is slit along the diametrically opposed sides thereof as indicated at 30, 30 to provide acess into the cable seating passages 24, 25. Likewise, adapter grommets 22 (FIGS. 2 and 3) are provided with a similar slit 32 permitting the adapters to be spread and assembled about a smaller diameter cable 16.

Another feature of the main grommets 20 is the provision of at least one and preferably a plurality of annular flexible ribs 34 encircling the exterior of the grommets as well as similar flexible ribs 35 projecting inwardly from the sidewalls of the cable seating passages 24, 25. These flexible resilient ribs accommodate tolerance variations in the dimensions of the parts and assure a fluid tight seal between the grommet, the interior sidewalls of tubular shell 18 and the exterior of cabling 15, or the exterior of adapter grommets 22.

Figure 3:
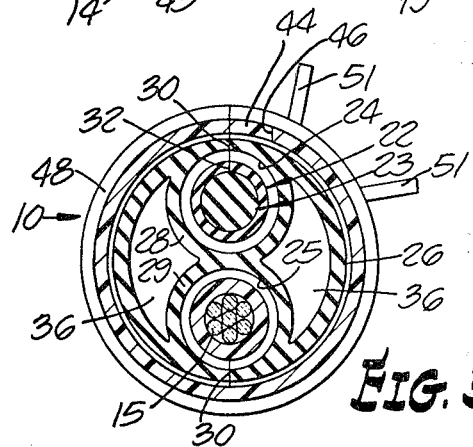
FIG. 3 is a cross sectional view on line 3—3 of FIG. 2 but showing the charging valve rotated to closed position.
Figure 6:
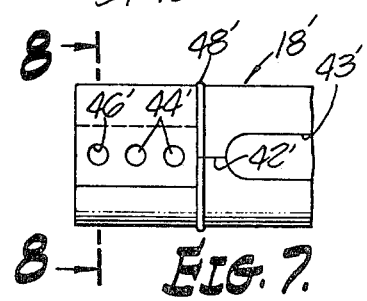
FIG. 6 is a perspective view of the kit of splice housing components typically employed to complete a splice between a main cable and a branchout cable.
Figure 2:
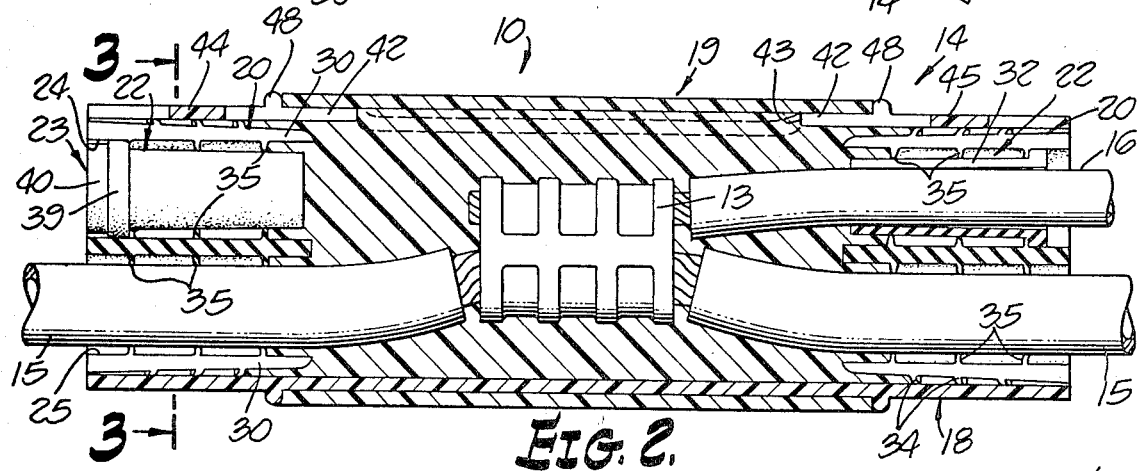
FIG. 2 is a longitudinal sectional view on an enlarged scale taken along line 2—2 on FIG. 1.
Figure 4:
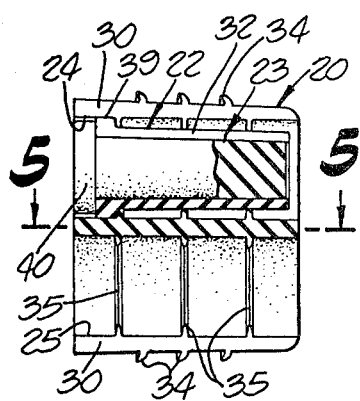
FIG. 4 is a cross sectional view of one of the grommet units showing one passage closed by an adapter grommet and a cooperating plug and the other cable passage empty.
Figure 5:
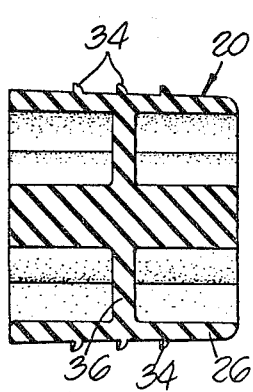
FIG. 5 is a cross sectional view taken along line 5—5 on FIG. 4.

It is also pointed out by reference to FIGS. 3, 4 and 5 that the walls of main grommet 20 are of similar thickness throughout and that the tubular walls of the main body as well as that forming passages 24, 25 are preferably interconnected interiorly of the grommet by a transverse partition 36. Actually, this partition comprises a pair of similar sector-shaped walls having the configuration best shown in FIG. 3 and there shown as positioned midway between the opposite ends of the grommet. These partitions seal off the interior of the splice housing from the atmosphere and reinforce and support the tubular walls 28, 29 encircling the spliced cables.

The outer ends of adapter grommets 22 have a flanged end 39 and likewise plug 23 has a flanged end 40 (FIG. 4) designed to abut flange 39 when assembled as shown in FIG. 4. If the passageway is occupied by a cable, plug 23 as well as the adapter grommet 22 may be discarded if not needed.

The main body shell 18 may be molded from any suitable rigid resilient elastomeric material, such as a high durometer plastic and one sidewall is slit from end to end as indicated at 42 in FIG. 1. A potting compound charging opening 43 is formed through the sidewall and conveniently intermediate the opposite ends of slit 42. This slit permits the housing shell to be expanded sufficiently to receive the main cable and branch cable. Upon releasing this spreading pressure, the housing quickly closes and is locked closed by the locking tangs, such as the tangs 44, 45 shown in FIG. 1. That is, which mate with complementally shaped cutouts 46, 47 in the other edge of the slit. The interlocking engagement or disengagement is accomplished simply by depressing one side of the shell more than the other until the tangs 44, 45 are in registry with the cutouts 46, 47. The presence of the grommet assemblies interiorly of the opposite ends of shell 18 do not interfere with the locking or unlocking of shell 18 owing to the resilience of the grommets and their compressibility.

Surrounding the central portion of the main body shell 18 and held captive between the annular keeper flanges 48, 48 is a tubular sleeve valve 19 formed of the same material as the main body shell. The valve is slit to provide a wide opening 50 throughout its length and out-turned opposite edges 51, 51 (FIG. 3) cooperate to provide a funnel or hopper facilitating charging the interior of the splice casing with potting compound when the valve opening is aligned with charging opening 43. Thereafter the valve is readily rotatable so that its opening 50 is misaligned with charging opening 43.

Figure 7:
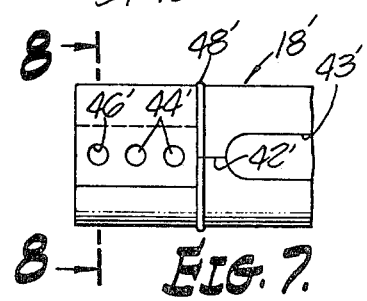
FIG. 7 is a fragmentary view of one end of an alternate splice housing construction.
Figure 8:
FIG. 8 is a cross sectional view on an enlarged scale taken along line 8—8 on FIG. 7.

Referring to FIGS. 7 and 8, a modified splice housing or shell 18' is shown which differs from that shown in FIGS. 1–6 only as respects the means for holding the shell slit locked closed, the same or similar parts described above being designated by the same reference characters but distinguished by the addition of a prime.

The end portions of shell 18' outwardly of the valve assembly flange 48' are tapered as is best shown in FIG. 8, and overlap one another in areas at the opposite ends of slit 42'. One of the tapered edges is provided with several locking bosses or tangs 44' seating in cutouts 46' formed through the other tapered edge of the slit. The overlapped edges are unlocked by depressing one edge relative to the other until the tangs are released from cutouts 46' whereupon the shell can be expanded or spread sufficiently to receive the spliced cabling.

In use, a section of the main distribution cable 15 has its sheath removed to expose the conductors and the same is true of one end of the branchout cable 16. Thereupon the ductile connector 13 is assembled over the exposed conductors of the cables, as described above, and clenched into its assembled position. The main grommets 20, 20 are then assembled over cables 15, 16 to either side of connector 13 by spreading the edges of the slits 30 for one of the passages 25 of each grommet. One of the adapter grommet sleeves 32 is then assembled over cable 16 at a point to the right of the splice housing, as viewed in FIG. 2, and cable 16 assembled into passage 24 of grommet 20. Thereafter, grommet 22 is slid axially along cable 16 until it is properly seated within passage 24. The interior of grommet 22 has a snug fit with the cable and its exterior is in wiping contact with the sealing ribs 35.

Grommets 20, 22 having been assembled, they are shifted as necessary along the cabling so that their remote ends are spaced apart by the length of the tubular shell 18 of the splice housing.

The next operation is to spread the opposite edge portions of slit 42 in shell 18 apart by inserting the fingers against the opposite longitudinal edges of the charging opening 43 for potting compound. While so spread the shell is inserted laterally over the cable splice and over both of grommets 20, 20 and its opposite ends are manipulated to interlock locking tangs 44 with cutouts 46. Valve sleeve 19 is then assembled laterally over the cabling to one end of the splice assembly and held expanded sufficiently for endwise telescopic assembly over the retainer flanges 48 for the valve sleeve. As soon as the valve is centralized between flanges 48, it is released and snugly grips the underlying portion of shell 18.

The splice assembly is now in readiness to be charged with potting compound. Package 12 is opened, the spring clip or other means on the potting compound package therewithin is removed so that the two principal ingredients can be intermixed. Valve 19 is rotated until the flanges 51, 51 are registered with the opposite edges of the charging opening 43. The compound is then poured into the opening as air within the splice housing escapes. As soon as the operator is certain that all portions of the interior are properly charged to a level flush with the charging opening, he rotates the valve to close opening 43 and allows the compound to take a firm set. Owing to the strong adhesive characteristics of the compound he bonds all parts together into an interior assembly and hermetically seals the splice against the entry of moisture.

While the particular slit tubular housing with integral lock to hold slit closed herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

We claim:

1. A cable splice housing adapted to be assembled about a cable splice from one lateral side thereof, said housing comprising an open-ended tubular shell of uniform diameter from end to end thereof and formed of rigid but resilient homogeneous plastic material having a single slit confined to one side thereof to permit spreading the opposed halves of said shell sufficiently to receive cabling radially of said tubular shell, the side wall of said tubular shell having a potting compound charging opening therethrough located inwardly from the opposite ends of said slit with the outer rim edges of said charging opening lying flush with the adjacent exterior surface of said shell, and locking means forming an integral part of said shell cooperable to lock said slit against spreading and located at either end of said compound charging opening, a tubular valve of resilient material slit lengthwise thereof, said valve having out-turned flanges along said slit, said valve having a snug resilient fit with the exterior of said tubular shell and being rotatable about the axis thereof, and means integral with one of said shell and said valve and cooperable with the other thereof to hold said valve assembled about said shell.

2. A cable splice housing adapted to be assembled about a cable splice from one lateral side thereof, said housing comprising an open-ended tubular shell of uniform diameter from end to end thereof and formed of rigid but resilient homogeneous plastic material having a single slit confined to one side thereof to permit spreading the opposed halves of said shell sufficiently to receive cabling radially of said tubular shell, the side wall of said tubular shell having a potting compound charging opening therethrough located inwardly from the opposite ends of said slit with the outer rim edges of said charging opening lying flush with the adjacent exterior surface of said shell, locking means forming an integral part of said shell cooperable to lock said slit against spreading and located at either end of said compound charging opening, and resilient sleeve valve means snugly embracing said shell and having an opening registrable with said charging opening when aligned therewith and rotatable to a position fully closing said charging opening.

3. A cable splice housing as defined in claim 2 characterized in that said tubular shell includes keeper means protruding outwardly therefrom adjacent either end of said tubular shell positioned to hold said valve means against movement axially of said shell while leaving said valve means free for rotation thereabout.

4. A cable splice housing adapted to be assembled about a cable splice from one lateral side thereof, said housing comprising an open-ended tubular shell of uniform diameter from end to end thereof and formed of rigid but resilient homogeneous plastic material having a single slit confined to one side thereof to permit spreading the opposed halves of said shell sufficiently to receive cabling radially of said tubular shell, the side wall of said tubular shell having a potting compound charging opening therethrough located inwardly from the opposite ends of said slit with the outer rim edges of said charging opening lying flush with the adjacent exterior surface of said shell, locking means forming an integral part of said shell cooperable to lock said slit against spreading and located at either end of said compound charging opening, and sleeve means snugly embracing said shell and shiftable thereon between an open position exposing said charging opening and a closed position fully closing said charging opening.

5. A cable splice housing adapted to be assembled about a cable splice from one lateral side thereof, said housing comprising an open-ended tubular shell of uniform diameter from end to end thereof and formed of rigid but resilient homogeneous plastic material having a single slit confined to one side thereof to permit spreading the opposed halves of said shell sufficiently to receive cabling radially of said tubular shell, the side wall of said tubular shell having a potting compound charging opening therethrough located inwardly from the opposite ends of said slit with the outer rim edges of said charging opening lying flush with the adjacent exterior surface of said shell, locking means forming an integral part of said shell cooperable to lock said slit against spreading and located at either end of said compound charging opening, and valve means mounted on said shell and movable relative thereto between open and closed positions for opening and closing said charging opening.

* * * * *